(12) United States Patent
Diorio et al.

(10) Patent No.: US 8,872,636 B1
(45) Date of Patent: *Oct. 28, 2014

(54) ALGORITHM-BASED RFID LOSS-PREVENTION SYSTEM

(71) Applicant: Impinj, Inc., Seattle, WA (US)

(72) Inventors: Christopher J. Diorio, Shorline, WA (US); Scott A. Cooper, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/969,308

(22) Filed: Aug. 16, 2013

Related U.S. Application Data

(63) Continuation-in-part of application No. 12/890,628, filed on Sep. 25, 2010, now Pat. No. 8,593,257.

(51) Int. Cl.
*H04Q 5/22* (2006.01)
*G08B 13/24* (2006.01)

(52) U.S. Cl.
CPC .................. *G08B 13/2462* (2013.01)
USPC ..................... 340/10.51; 340/572.4; 380/270; 713/176

(58) Field of Classification Search
USPC .............. 340/10.1, 10.51, 5.61, 572.1, 572.4; 380/270; 713/176
See application file for complete search history.

(56) References Cited

U.S. PATENT DOCUMENTS

| 7,327,216 | B2* | 2/2008 | Ghabra et al. | 340/5.26 |
|---|---|---|---|---|
| 7,800,499 | B2* | 9/2010 | Rehman | 340/572.1 |
| 2006/0181397 | A1* | 8/2006 | Limbachiya | 340/10.51 |
| 2006/0230276 | A1* | 10/2006 | Nochta | 713/176 |
| 2008/0150702 | A1* | 6/2008 | Neill et al. | 340/10.42 |
| 2009/0160615 | A1* | 6/2009 | O'Brien et al. | 340/10.1 |
| 2010/0308978 | A1* | 12/2010 | Brown | 340/10.42 |

OTHER PUBLICATIONS

Final Office Action received for U.S. Appl. No. 13/969,198, mailed Jun. 11, 2014 and filed Aug. 16, 2013.
Office Action received for U.S. Appl. No. 13/972,825, mailed Jun. 4, 2014 and filed Aug. 21, 2013.

* cited by examiner

*Primary Examiner* — Thomas Mullen
(74) *Attorney, Agent, or Firm* — Turk IP Law, LLC

(57) ABSTRACT

In RFID systems employed for loss prevention, an item supplier or an ingress reader writes an ownership code associated with an organization or facility into a tag, indicating that an item to which the tag is attached is associated with the facility and not foreign. At checkout or point-of-sale an authorization reader or mobile device writes a computed code and/or a ticket into the tag indicating that the tagged item is allowed to leave the facility. At point-of-exit an exit reader determines if the tagged item is allowed to leave the facility by verifying the ownership code and the code or ticket. The loss-prevention system may issue an alert or sound an alarm if a facility-associated item is leaving the facility without a proper code or ticket indicating that the item is approved to leave.

21 Claims, 14 Drawing Sheets

ALGORITHM-BASED RFID LOSS-PREVENTION SYSTEM

CROSS REFERENCE TO RELATED APPLICATIONS

This application is a continuation-in-part of U.S. patent application Ser. No. 12/890,628 filed on Sep. 25, 2010, and issued as U.S. Pat. No. 8,593,257 on Nov. 26, 2013. The disclosures of this patent application are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

RFID technology may be employed in loss-prevention systems used, for example, by retailers. Point-of-Exit (PoE) readers deployed at store exits read tagged items exiting the store and determine if the item is approved to leave. However, the determination can be challenging. In one approach, a store database maintains information about all items in the store, and indicates if an item is approved to leave. The PoE reader then checks the database for approval. Unfortunately, implementing the database may be costly and/or complex, especially for large stores that contain a large number of items, multiple entrances and exits, and multiple Point-of-Sale or checkout registers (collectively, PoS) that must continually update the database.

In another approach, the tags themselves retain information about whether they are approved to leave the store, and the PoE reader checks each tag for approval. Authorization readers at PoS may write a bit or bits to each tag indicating that the item is approved to leave. Unfortunately, this approach is susceptible to thieves using unauthorized readers to illegitimately set the bit or bits, typically necessitating a password-based authorization system that is complicated to maintain and use and is itself susceptible to attack.

Finally, for both approaches, foreign tags entering a store (such as a tag carried by a consumer on his or her person) may further complicate the situation because the PoE reader must determine if a departing item is foreign or stolen.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to RFID systems for loss prevention. An ownership code (OC) associated with an organization or facility is stored in a tag, indicating that an item to which the tag is attached is associated with the facility and not foreign (a foreign tag indicates an item not associated with the facility). In one embodiment, an authorization reader writes a code computed by an algorithm into the tag to indicate that the tagged item is allowed to leave the facility. The code may be based on information stored in the tag such as the tag's item identifier or other tag information (collectively an item identifier or II) and/or other information such as the OC or an authorization reader identifier. The code may be generated based on a secret or private key associated with the facility, in which case the code is referred to as a "digital signature" (DS). The authorization reader may also (or instead) write a temporal parameter (TP) to the tag or use the TP to compute the code. A TP may include a ticket value selected from a scratchlist, may be based on a date or time (for example, a date and/or time of the authorization for the tagged item to be removed), may be based on the location or identity of the authorization reader, and/or may be based on information stored on the tag (e.g., tag/item identifiers). A PoE reader verifies that, for items whose OC is associated with the facility, the code and/or TP is legitimate or proper and therefore the item is approved to leave the facility.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions. "Protocol" refers to an industry standard for communications between a reader and a tag (and vice versa), such as the Class-1 Generation-2 UHF RFID Protocol for Communications at 860 MHz-960 MHz by EPCglobal, Inc. ("Gen2 Specification"), version 1.2.0 of which is hereby incorporated by reference.

Figure 1:
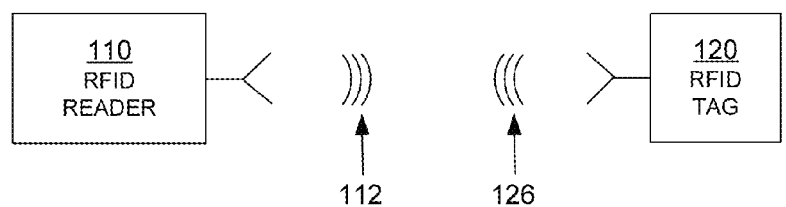
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generates signal 126 in response. RFID reader 110 senses and interprets signal 126. The signals 112 and 126 may include RF waves and/or non-propagating RF signals (e.g., reactive near-field signals)

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
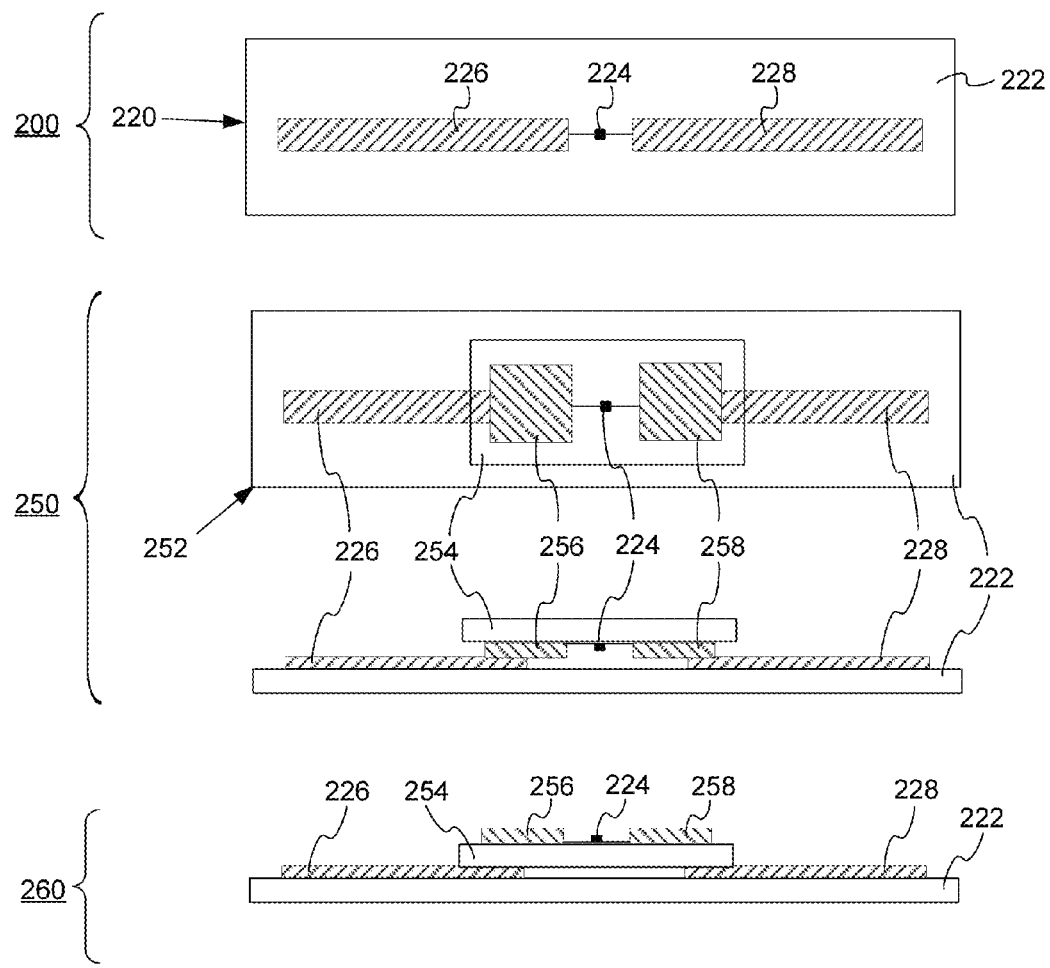
FIG. 2 is a diagram showing components of a passive RFID tag, such as a tag that can be used in the system of FIG. 1.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable antenna contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive.

IC 224 is shown with a single antenna port, comprising two antenna contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the antenna contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the antenna contacts of IC 224 can modulate the antenna's reflectance, as can varying the admittance of a shunt-connected circuit element which is coupled to the antenna contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

Figure 3:
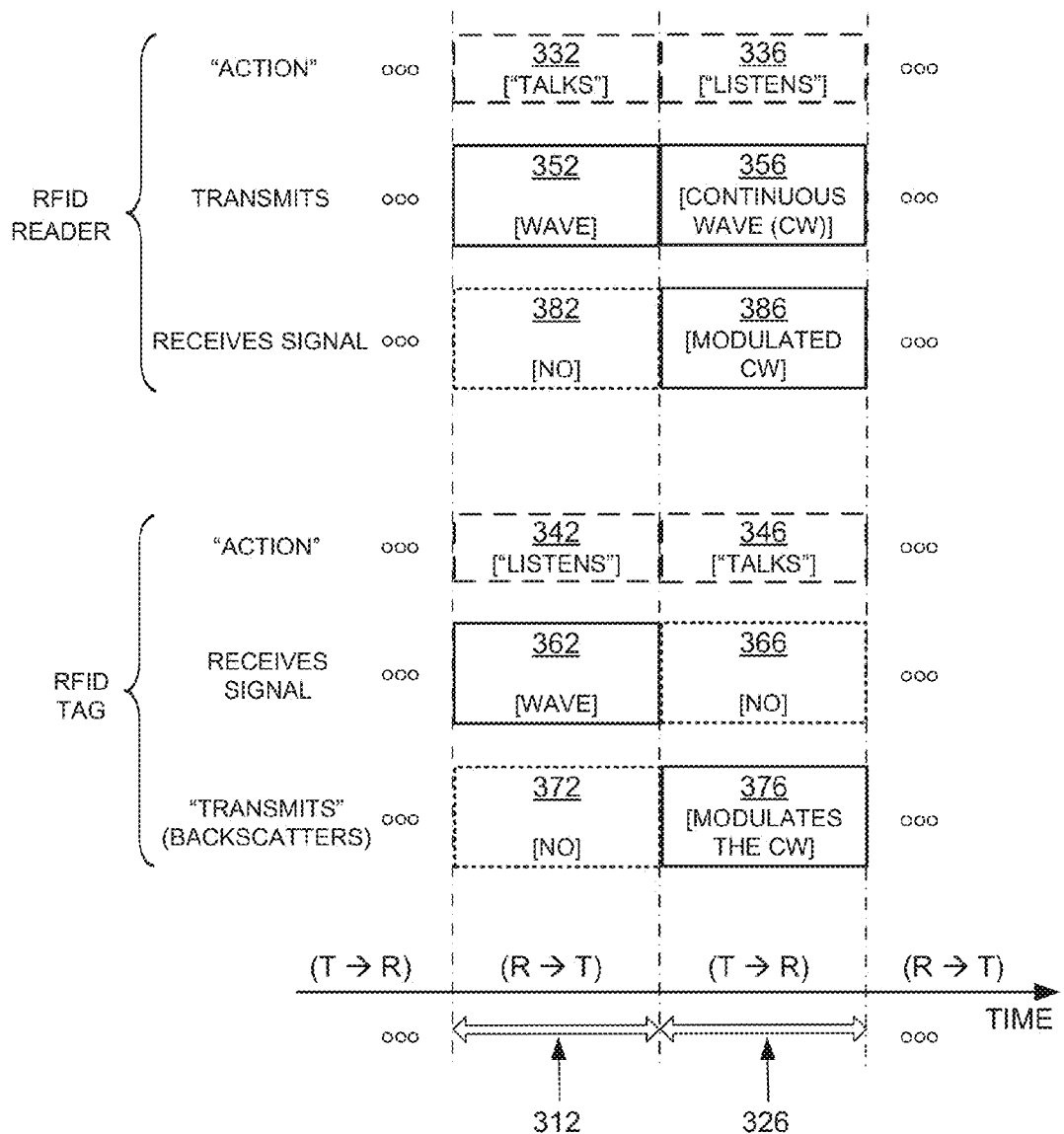
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

Figure 4:
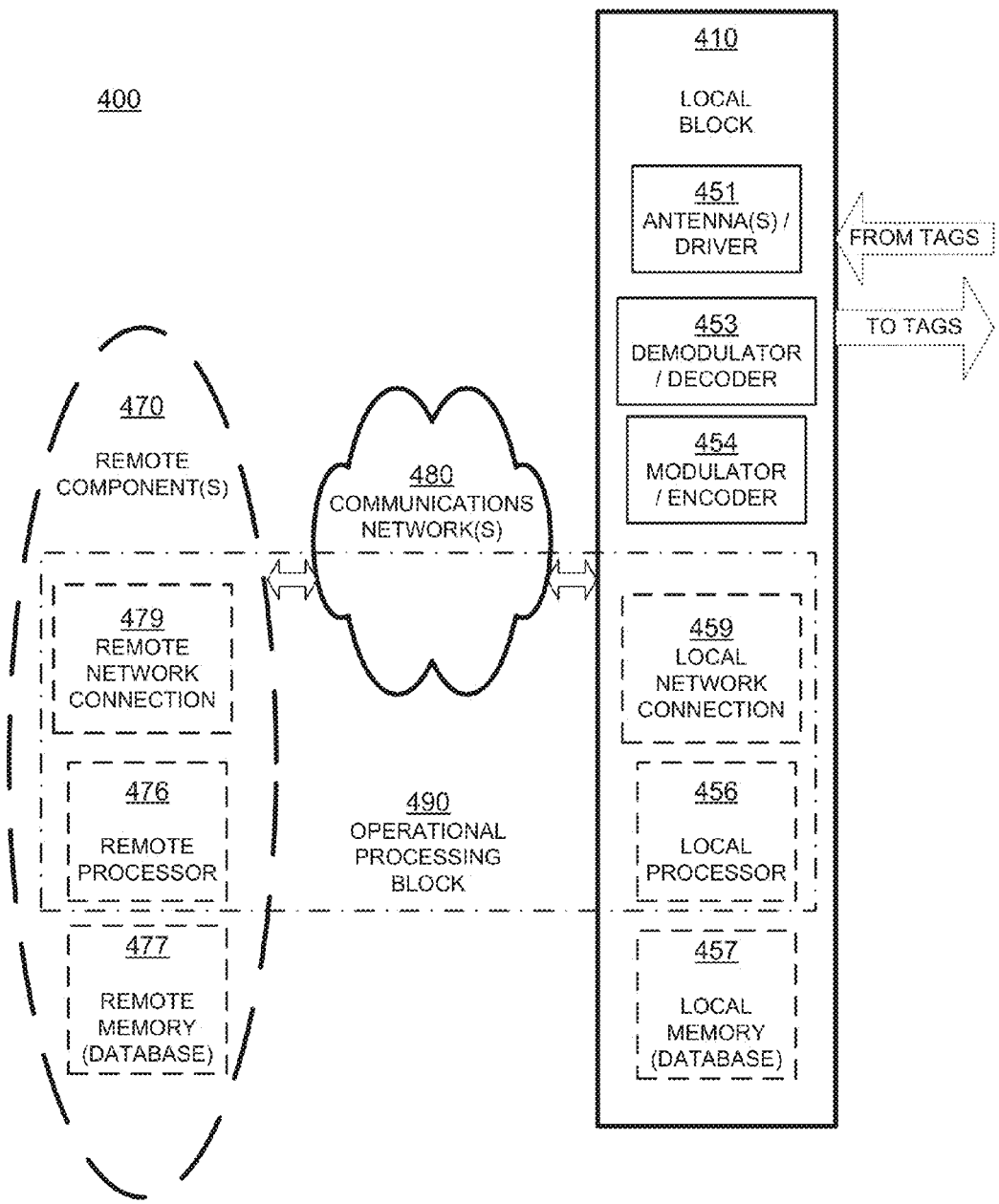
FIG. 4 is a block diagram showing a detail of an RFID reader system, such as the one shown in FIG. 1.

FIG. 4 is a block diagram of an RFID reader system 400 according to embodiments. RFID reader system 400 includes a local block 410, and optionally remote components 470. Local block 410 and remote components 470 can be implemented in any number of ways. It will be recognized that RFID reader 110 of FIG. 1 is the same as local block 410, if remote components 470 are not provided. Alternately, RFID reader 110 can be implemented instead by RFID reader system 400, of which only the local block 410 is shown in FIG. 1.

Local block 410 is responsible for communicating with the tags. Local block 410 includes a block 451 of an antenna and a driver of the antenna for communicating with the tags. Some readers, like that shown in local block 410, contain a single antenna and driver. Some readers contain multiple antennas and drivers and a method to switch signals among them, including sometimes using different antennas for transmitting and for receiving. Some readers contain multiple antennas and drivers that can operate simultaneously. A demodulator/decoder block 453 demodulates and decodes backscattered waves received from the tags via antenna/driver block 451. Modulator/encoder block 454 encodes and modulates an RF wave that is to be transmitted to the tags via antenna/driver block 451.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases local processor 456 may implement an encryption or authorization function; in some cases one or more of these functions can be distributed among other blocks such as encoding block 454, or may be entirely incorporated in another block.

Local block 410 additionally includes an optional local memory 457. Local memory 457 may be implemented in any number of ways known in the art. Such ways include, by way of examples and not of limitation, nonvolatile memories (NVM), read-only memories (ROM), random access memories (RAM), any combination of one or more of these, and so on. These memories can be implemented separately from local processor 456, or in a single chip with local processor 456, with or without other components. Local memory 457, if provided, can store programs for local processor 456 to run, if needed.

In some embodiments, local memory 457 stores data read from tags, or data to be written to tags, such as Electronic Product Codes (EPCs), Tag Identifiers (TIDs) and other data. Local memory 457 can also include reference data that is to be compared to the EPC codes, instructions and/or rules for how to encode commands for the tags, modes for controlling antenna 451, secret keys, key pairs, and so on. In some of these embodiments, local memory 457 is provided as a database.

Some components of local block 410 typically treat the data as analog, such as the antenna/driver block 451. Other components such as local memory 457 typically treat the data as digital. At some point there is a conversion between analog and digital. Based on where this conversion occurs, a reader may be characterized as "analog" or "digital", but most readers contain a mix of analog and digital functionality.

If remote components 470 are indeed provided, they are coupled to local block 410 via an electronic communications network 480. Network 480 can be a Local Area Network (LAN), a Metropolitan Area Network (MAN), a Wide Area Network (WAN), a network of networks such as the internet, or a mere local communication link, such as a USB, PCI, and so on. In turn, local block 410 then includes a local network connection 459 for communicating with communications network 480. Communications on the network can be secure, such as if they are encrypted or physically protected, or insecure if they are not encrypted or otherwise protected.

There can be one or more remote component(s) 470. If more than one, they can be located at the same location, or in different locations. They can access each other and local block 410 via communications network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Remote processor 476 can be made in any way known in the art, such as was described with reference to local processor 456. Remote processor 476 may also implement an encryption function, similar to local processor 456.

Remote component(s) 470 can also include a remote memory 477. Remote memory 477 can be made in any way known in the art, such as was described with reference to local memory 457. Remote memory 477 may include a local database, and a different database of a Standards Organization, such as one that can reference EPCs. Remote memory 477 may also contain information associated with command, tag profiles, keys, or the like, similar to local memory 457.

Of the above-described elements, it may be advantageous to consider a combination of these components, designated as operational processing block 490. Operational processing block 490 includes those components that are provided of the following: local processor 456, remote processor 476, local network connection 459, remote network connection 479, and by extension an applicable portion of communications network 480 that links remote network connection 479 with local network connection 459. The portion can be dynamically changeable, etc. In addition, operational processing block 490 can receive and decode RF waves received via antenna 451, and cause antenna 451 to transmit RF waves according to what it has processed.

Operational processing block 490 includes either local processor 456, or remote processor 476, or both. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing operational processing block 490.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 5:
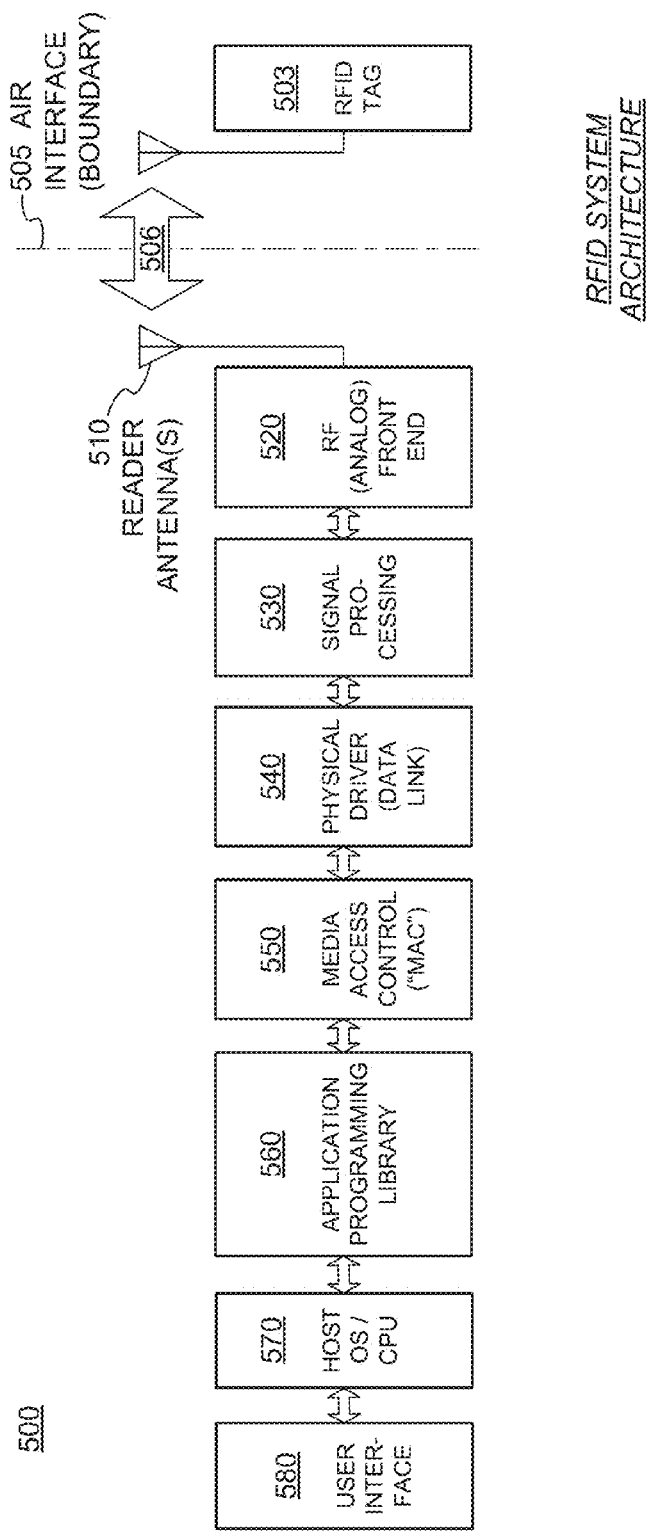
FIG. 5 is a block diagram illustrating an overall architecture of an RFID system according to embodiments.

FIG. 5 is a block diagram illustrating an overall architecture of an RFID reader 500 according to embodiments. It will be appreciated that RFID reader 500 is considered subdivided into modules or components. Each of these modules may be implemented by itself, or in combination with others. In addition, some of them may be present more than once. Other embodiments may be equivalently subdivided into different modules. It will be recognized that some aspects are parallel with what was described previously.

An RFID tag 503 is considered here as a module by itself. RFID tag 503 conducts a wireless communication 506 with the remainder, via the air interface 505. It is noteworthy that air interface 505 is really only a boundary, in that signals or data that pass through it are not intended to be transformed from one thing to another. Specifications as to how readers and tags are to communicate with each other, for example the Gen 2 Specification, also properly characterize that boundary as an interface.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges waveforms with RF front-end module 520, such as I and Q waveform pairs.

RFID system 500 also includes a physical-driver module 540, which is also known as data-link module. In some embodiments physical-driver module 540 exchanges bits with signal-processing module 530. Physical-driver module 540 can be the stage associated with the framing of data.

RFID system 500 additionally includes a media access control module 550, which is also known as MAC layer module. In one embodiment, MAC layer module 550 exchanges packets of bits with physical driver module 540. MAC layer module 550 can make decisions for sharing the medium of wireless communication, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered as a separate module, but one that includes some of the above-mentioned modules of RFID system 500. In some embodiments the one or more processors may perform operations associated with calculating and/or writing an OC and/or a DS to the tag as part of a loss-prevention system.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 510 receives wireless waves, which are in turn processed successively by the various modules in the chain. Processing can terminate in any one of the modules. In transmitting mode, waveform initiation can be in any one of the modules. Ultimately, signals are routed to reader antenna(s) 510 to be transmitted as wireless waves.

The architecture of RFID system 500 is presented for purposes of explanation, and not of limitation. Its particular subdivision into modules need not be followed for creating embodiments. Furthermore, the features of the present disclosure can be performed either within a single one of the modules, or by a combination of them.

As mentioned previously, embodiments are directed to employing RFID readers and tags in a loss-prevention system. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions of a program made according to the embodiments. A storage medium according to the embodiments is a computer-readable medium, such as a memory, and is read by a processor of the type mentioned above. If a memory, it can be implemented in a number of ways, such as Read Only Memory (ROM), Random Access Memory (RAM), etc., some of which are volatile and some nonvolatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

As described above, an authorization reader may authorize a tag and its associated item to leave a particular facility by writing a computed code and/or temporal parameter to the tag. A "code" as used herein is numerical value that may be expressed as a single- or multi-bit value in a binary, octal, hexadecimal, decimal, or any other suitable format. The authorization reader may compute the code based on an algorithm with one or more different inputs. For example, the code may be computed based on an algorithm having one or more arithmetic operations, logical operations, bit-shifting operations, truncation operations (i.e., operations that reduce the bit length of an input code, for example by discarding input code bits), extension operations (i.e., operations that increase the bit length of an input code, for example by padding or concatenation), and/or any other suitable operations that output a code. The inputs into the algorithm may include identifiers such as the II, the OC, and/or reader identifier(s), one or more temporal parameters, or any other suitable parameters.

Figures 6A, 6B:
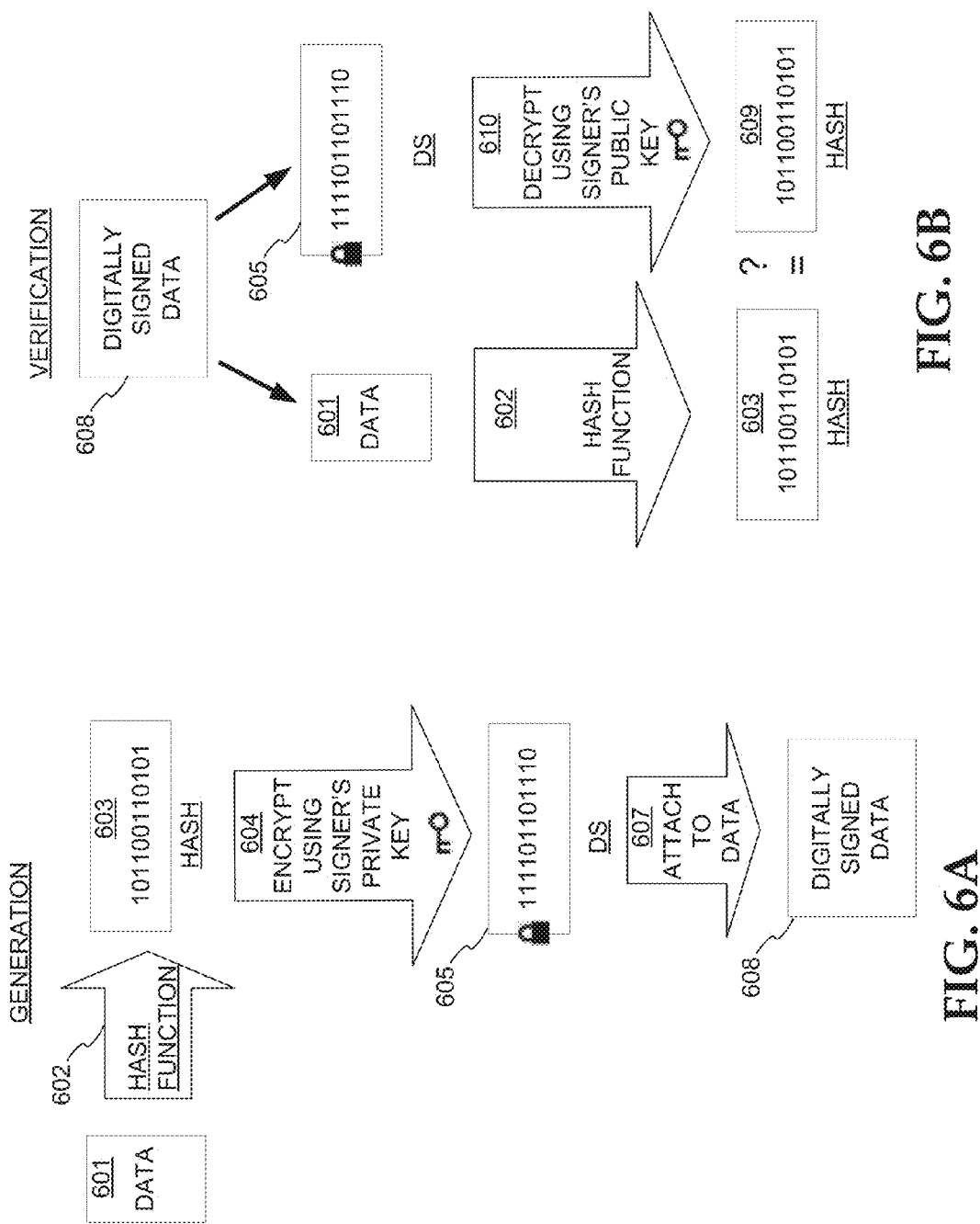
FIG. 6A is a flow diagram illustrating generating and writing a digital signature using a private key.
FIG. 6B is a flow diagram illustrating verifying a digital signature using a public key.

In some embodiments, an authorization reader uses a cryptographic algorithm to compute the code. In this case, the code is known as a "digital signature". Digital signatures allow the authenticity and integrity of a digital message to be verified. FIGS. 6A and 6B are flow diagrams illustrating generating and verifying a digital signature (DS).

Digital signatures are typically referred to in the context of asymmetric cryptography. A signatory, also referred to as a sender, possesses a private/public key pair where the private and public keys are mathematically related to each other. The sender uses the private key to generate the DS. A recipient uses the sender's public key to verify the DS. A verified DS gives the recipient reason to believe that the message was created by a known sender, and that it was not altered in transit.

A message authentication code (MAC) is the digital-signature equivalent in the context of symmetric cryptography. A signatory, also referred to as a sender, possesses a secret key and the sender uses the secret key to generate the MAC. A recipient can use the same secret key to verify the MAC. A verified MAC gives the recipient reason to believe that the message was created by a known sender, and that it was not altered in transit. The term "digital signature" or "DS" as used in this disclosure may refer to a DS generated using asymmetric cryptography or to a MAC generated using symmetric cryptography.

FIG. 6A is a flow diagram illustrating an asymmetric method for generating a DS. The method described in FIG. 6A is also known as a digital signature with appendix. A hash value 603 is derived from data 601 and hash function 602. The hash value 603 is encrypted using the signer's private key (604). The encrypted hash value is the DS 605. The DS 605 is attached to the data 601 to form digitally signed data 608.

FIG. 6B is a flow diagram illustrating an asymmetric method for verifying a DS. The digitally signed data 608 is split into two components, data 601 and DS 605. The hash value 603 is derived from data 601 and hash function 602. The DS 605 is decrypted using the signer's public key 610 to form decrypted hash 609. The hash value 603 is compared with the decrypted hash value 609. If the hash value 603 is equal to the decrypted hash value 609 then the DS 605 is considered verified or proper. A verified DS provides assurance that the data 601 was signed by the known sender and that the data has not been altered.

An important attribute of digital signatures is that they are difficult to forge or clone. A number of standards have been developed for digital signatures. The Digital Signature Standard (DSS) is a U.S. Government standard for digital signatures. DSS is specified in Federal Information Processing Standards (FIPS) 186-1 and FIPS 186-3. FIPS 186-1 specifies two digital signature algorithms, the Digital Signature Algorithm (DSA) and the RSA digital signature algorithm. FIPS 186-3 includes a third digital signature algorithm, the Elliptic Curve Digital Signature Algorithm (ECDSA). FIPS 180-3, Secure Hash Standard (SHS), specifies the hash functions to be used in conjunction with FIPS 186-1 and FIPS 186-3.

In some embodiments, digital signatures may be generated without using a separate hash, using a digital signature scheme with message recovery. In such embodiments, DS 605 may be generated directly from data 601, and digitally signed data 608 only includes DS 605. During verification, the DS 605 is directly decrypted with the public key to provide data 601. Of course, other digital signature schemes may be used.

Figure 7A:
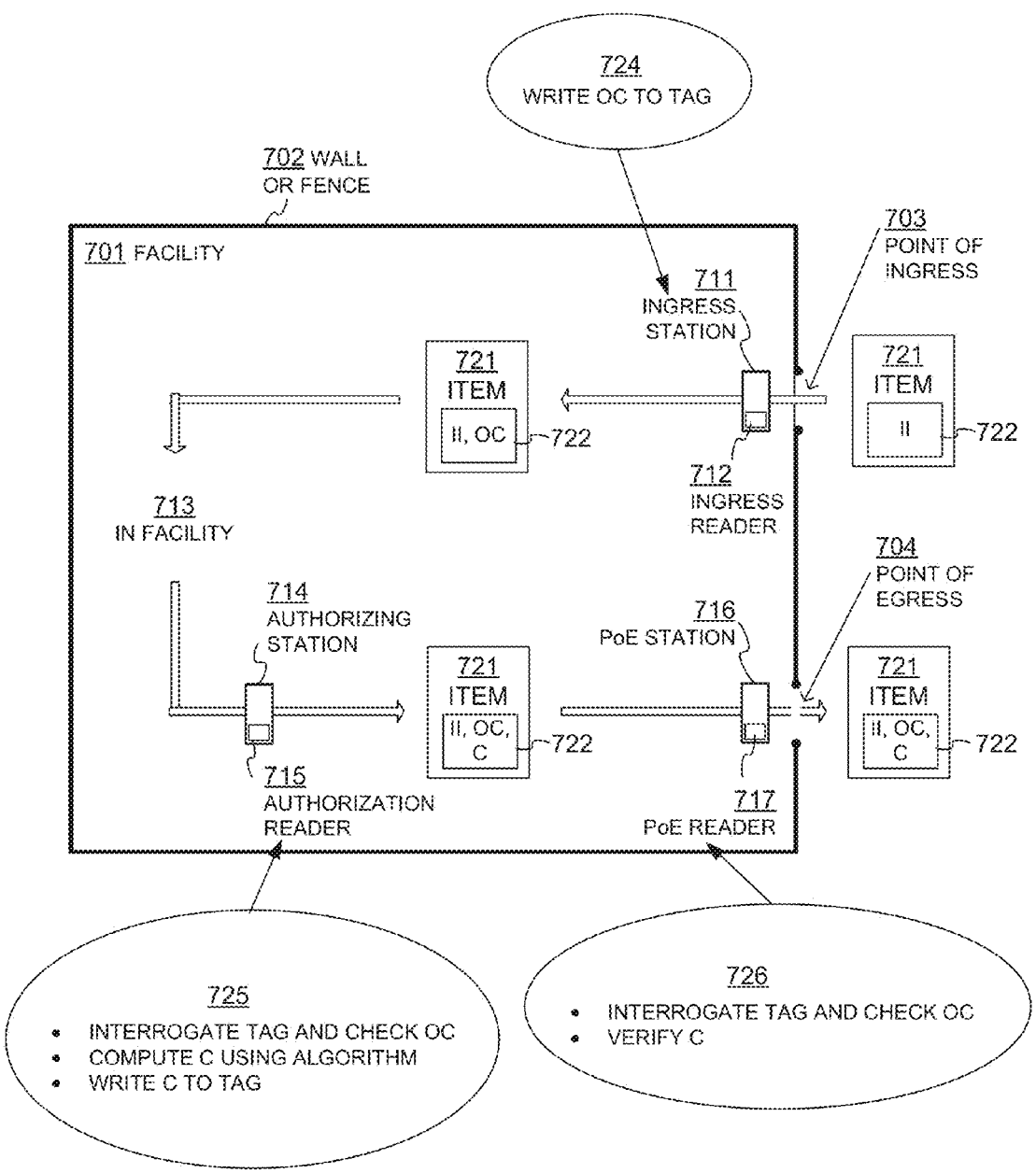
FIG. 7A is a conceptual diagram displaying authorization and exit verification.

FIG. 7A is a conceptual diagram illustrating an example RFID-based loss-prevention system. Facility 701 may be a building or yard such as a retail store, a laboratory, a warehouse, a construction facility, or similar. Facility 701 is typically enclosed by a wall or fence 702. An RFID-based loss-prevention system according to embodiments restricts unauthorized items from leaving facility 701 while allowing foreign items (items not owned by the facility) to be brought in and removed freely.

Item 721 is typically delivered to facility 701 with a tag 722 having a preprogrammed II. In some embodiments tag 722 may arrive pre-preprogrammed with both an II and an OC. In other embodiments item 721 may be delivered without tag 722, and a tag 722 is programmed with an II and an OC and attached to item 721 in the facility. In yet other embodiments item 721 may be delivered with a blank or unprogrammed tag 722, leaving the II and OC to be programmed within the facility. Regardless of the tagging approach, item 721 enters point-of-ingress 703. An optional ingress station 711 including an ingress reader 712 reads tag 722 and, if the tag is lacking an II or OC, writes them into the tag at operation 724. Note that ingress station 711 can be located anywhere in facility 701; can be outside the facility; can be a separate facility which performs tag encoding, or could even be a mobile reader such as a handheld device. In some embodiments, separate readers may be used to write the II and the OC into the tag. A reader may check to see if the tag lacks an II or OC before writing, or may write the II/OC without checking.

Regardless of the methodology, after ingress and encoding the tagged item, containing an II and OC, will be at location 713 in the facility.

Items must be authorized to leave the facility. The authorization process is performed at authorization station 714 using authorization reader 715. As described in process 725, authorization reader 715 interrogates tag 722 attached to item 721, confirms that the OC is associated with facility 701, computes a code C using an algorithm, and writes the code C into the tag. In some embodiments C may be computed at least in part from the tag's II, the OC, and/or a TP. C may also (or instead) include a DS generated as described above. A tag 722 with a proper C is authorized to leave the facility. In some embodiments authorizing reader 715 may also write the TP into tag memory.

At the facility point-of-egress 704, a PoE reader 717 located at PoE station 716 interrogates the tag and reads its OC, C, and optionally its TP and/or II. As described at operation 726, PoE reader 717 checks the tag's OC and if the item is associated with the facility then verifies that C is proper. In some embodiments, PoE reader 717 knows the algorithm and inputs used to compute C, and verifies C by computing a new verification value with the algorithm and inputs and comparing the verification value with C. In other embodiments, PoE reader 717 may instead use C in a reverse computation. For example, PoE reader 717 may reverse the algorithm (or know the reversed algorithm) and use the reversed algorithm to compute the initial inputs given C. If PoE reader 717 knows what the correct initial inputs should be, it can compare the computed initial inputs with the correct initial inputs to verify C. In embodiments where C includes a DS, PoE reader 717 may verify the DS using the facility's secret for symmetric cryptosystems or using the facility's public key for asymmetric cryptosystems. If PoE reader 717 verifies that C is proper then item 721 may be removed through point of egress 704. If C is not proper then PoE station 716 may sound an alarm or otherwise notify authorities that an unauthorized item is departing the facility. Points of ingress and egress 703 and 704 may include doors, doorways, hallways, ramps, garages, and similar.

In some embodiments, the TP may include one-time, disposable codes (referred to herein as "tickets") to supplement and/or entirely replace C. A ticket encodes some information known to both an authorization reader (e.g., authorization reader 715) and a PoE reader (e.g., PoE reader 717), and is used by an authorization reader to indicate to a PoE reader that a particular item or tag is authorized to leave the facility. In typical embodiments, tickets are multi-bit values (i.e., include more than one bit).

Figure 7B:
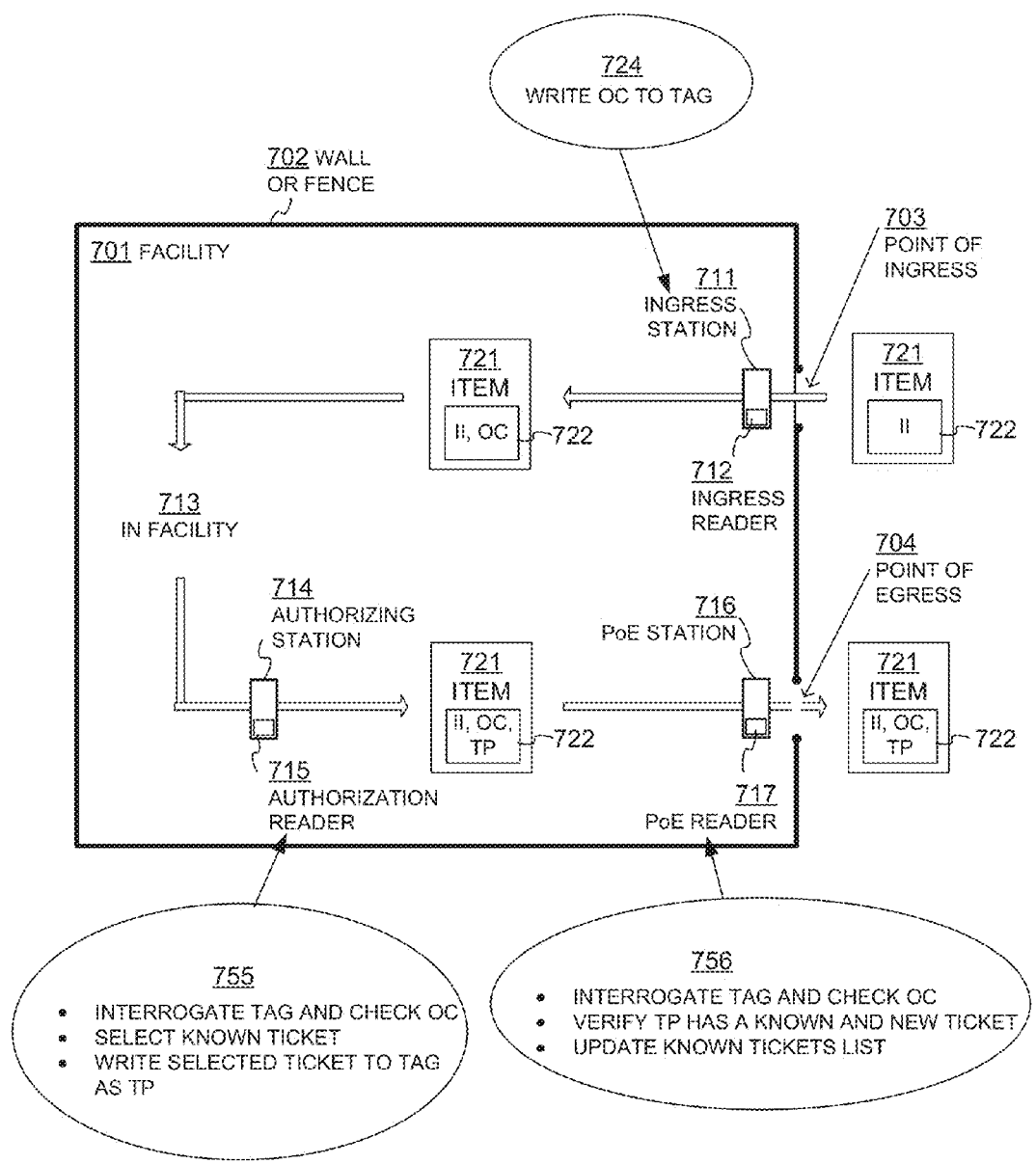
FIG. 7B is another conceptual diagram displaying authorization and exit verification.

FIG. 7B is another conceptual diagram displaying authorization and exit verification. FIG. 7B is similar to FIG. 7A, with similarly-numbered elements behaving similarly. However, in FIG. 7B, when authorization reader 715 determines that item 721 and attached tag 722 are authorized to leave facility 701 at operation 755, it may select a particular ticket known to the authorization reader 715 and write the selected ticket to tag 722 in addition to or in place of the code C (e.g., as a TP).

As mentioned above, tickets are one-time, disposable codes. After authorization reader 715 assigns the selected ticket to tag 722, it disposes of the selected ticket to prevent reuse by the authorization reader 715. For example, the authorization reader 715 may dispose of the selected ticket by deleting the ticket from its memory, flagging the ticket in reader memory, associating an identifier (e.g., an authorization reader identifier, an item identifier, a tag identifier, and/or a TP) with the ticket in reader memory, or otherwise indicating that that selected ticket has been used. As a result, each tag authorized to leave facility 701 stores a different TP for at least a period of time.

Subsequently, at the facility point-of-egress 702, PoE reader 717 will read the TP stored on tag 722 in addition to confirming the OC at operation 756. PoE reader 717 itself knows the tickets that authorization reader 715 knows, and can confirm if the TP stored on tag 722 includes a known ticket (and therefore presumably written by authorization reader 715). Moreover, PoE reader 717 can determine if the ticket stored on tag 722 is new (i.e., previously not read by a PoE reader) or has been previously observed by a PoE reader. If the ticket stored on tag 722 is new, then PoE reader 717 assumes that tag 722 is authorized to leave (i.e., that authorization reader 715 authorized the tag to leave by storing the ticket on the tag) and allows tag 722 and item 721 to leave facility 701. PoE reader 717 then updates its known tickets to indicate that the ticket stored on tag 722 has now been seen. For example, PoE reader 717 may flag the ticket or associated it with one or more identifiers (e.g., the II, the OC, and/or identifier(s) associated with the PoE reader or the authorization reader). Subsequently, if PoE reader 717 sees a tag with the same, previously-read ticket under certain circumstances (e.g., after some time has passed or if there is a mismatch between an identifier associated with the tag and an identifier previously associated with the ticket) it may assume that an attacker is trying to remove unauthorized items from facility 701, and may sound an alarm or otherwise notify authorities. Similarly, if an unknown ticket is stored on tag 722, or if no ticket or an otherwise invalid ticket is stored on tag 722, then PoE reader 717 may also sound an alarm or otherwise notify authorities.

Figure 7C:
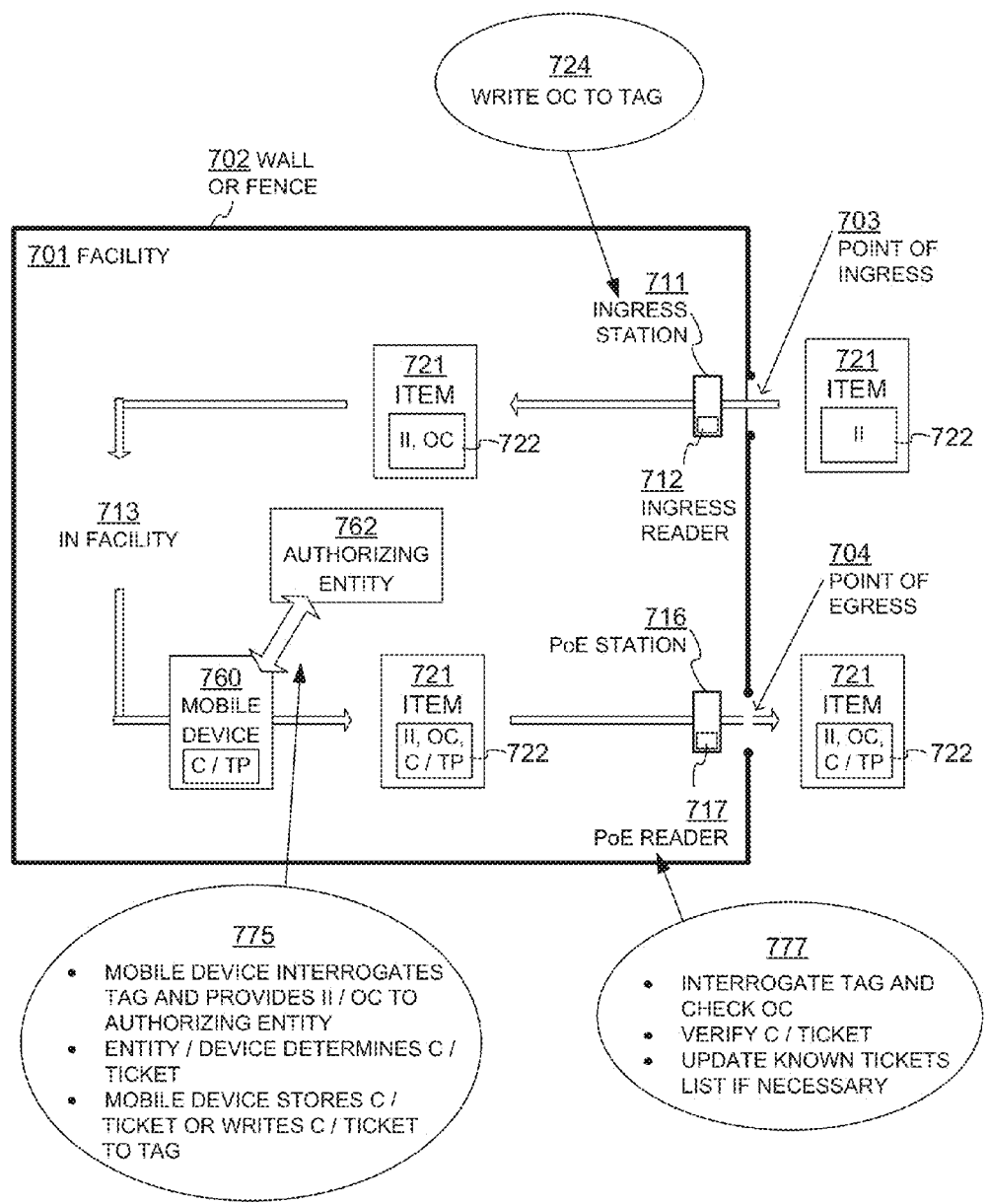
FIG. 7C is yet another conceptual diagram displaying authorization and exit verification.

FIG. 7C is yet another conceptual diagram displaying authorization and exit verification. FIG. 7C is similar to FIGS. 7A and 7B, with similarly-numbered elements behaving similarly. However, in FIG. 7C authorizing station 714/authorization reader 715 does not write code C or a determined ticket into tag 722. Instead, a mobile device 760 and an authorizing entity 762 are used to authorize item 721 and attached tag 722 to leave facility 701. Mobile device 760, such as a smartphone, a portable reader, a laptop, a tablet, or other portable electronic device, may be associated with an entity who will be removing item 721 and attached tag 722 from facility 701. For example, the entity may be a customer or consumer purchasing item 721, an employee transporting item 721 to another location, or any other suitable person or entity. Authorizing entity 762 is associated with facility 701 and is capable of authorizing the removal of items and tags from facility 701. Authorizing entity 762 may be an authorizing station (e.g., authorizing station 714), processor, or server located at facility 701 or at a remote location. Regardless of its location, authorizing entity 762 is capable of communicating with mobile device 760, for example via wired (Ethernet, USB, serial, etc.) or wireless (WiFi, Bluetooth, 2G/3G/4G, RF, etc.) signals.

At operation 775, mobile device 760 interrogates tag 722 to retrieve an II and an OC. Mobile device 760 then provides the II/OC to authorizing entity 762. In some embodiments, mobile device 760 may provide additional information to authorizing entity 762. For example, a mobile device associated with a customer may provide payment information (e.g., payment authorization or proof-of-payment) for the item 721. A mobile device associated with an employee may provide employee identification information and/or transportation information for item 721.

In response, authorizing entity 762 computes a code C (e.g., as described above in FIG. 7A) and/or selects a ticket (e.g., as described above in FIG. 7B) and provides the code C/ticket to mobile device 760. In some embodiments, mobile device 760 may itself compute at least a part of code C and/or select the ticket. For example, authorizing entity 762 may provide some information or seed value to mobile device 760 for computing code C or selecting a ticket. Mobile device 760, which is capable of storing data on RFID tags (either inherently or using an external attachment), then stores the code C/ticket and/or writes the code C/ticket into tag 722. At operation 777, PoE reader 717 may verify the code written into tag 722 or stored on mobile device 760, as described above in FIGS. 7A and 7B, and update a known ticket list if necessary. In situations where mobile device 760 stores the provided code instead of writing it into tag 722, PoE reader 717 may determine if mobile device 760 accompanies tag 722 when departing facility 701, and if mobile device 760 stores a correct code (C and/or ticket). If so, PoE reader 717 may allow tag 722 to leave facility 701; otherwise, PoE reader 717 may sound an alarm or otherwise notify authorities.

As described above, tickets are one-time, disposable codes that an authorization reader stores on a tag to indicate to a PoE reader that the tag is authorized to leave a facility. Tickets may be generated by a facility (e.g., facility 701), a parent of the facility, an organization associated with the facility, a security agency or organization, or any other suitable entity, and then distributed to authorization and PoE readers. Since a PoE reader may determine whether a tag storing a ticket is authorized to leave based on whether its stored ticket has been previously seen, ticket generation may be configured to assure that each ticket is substantially unique for at least a period of time. For example, tickets may be a randomly-generated number, may be based on a particular tag or tag type, item or item type, or other identifier, may be based on information related to the authorization reader, or may be based on any other suitable data. New tickets may be generated periodically (e.g., every minute, hour, day, week, month, etc.) or dynamically (e.g., as needed). A particular ticket may be guaranteed to be unique (at least with respect to the facility) for a particular predefined or dynamic period of time (e.g., minutes, hours, days, weeks, months, etc.). Similarly, ticket distribution may be configured to assure that different authorization readers do not inadvertently assign the same ticket to different tags.

Figure 8:
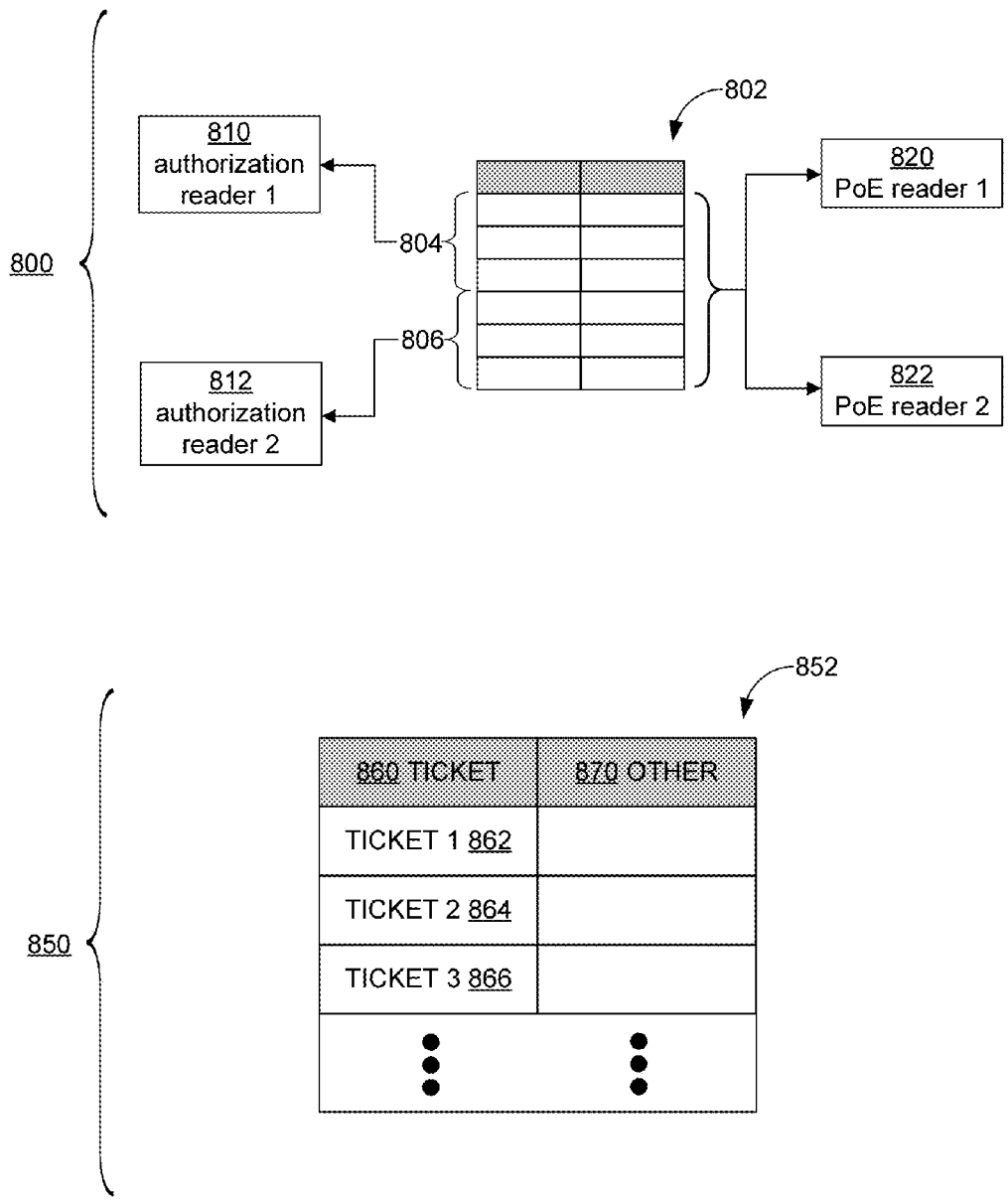
FIG. 8 illustrates how tickets may be distributed to authorizing and point-of-exit readers.

FIG. 8 illustrates how tickets may be distributed to authorizing and point-of-exit readers. Diagram 800 depicts a ticket list 802, referred to herein as a "scratchlist". Scratchlist 802 includes multiple tickets, each different. To assure that different authorization readers do not inadvertently assign the same ticket to different tags, scratchlist 802 (and the included tickets) is divided into several non-overlapping portions 804 and 806, each of which contains a different set of tickets and is provided to a different authorization reader. For example, portion 804 is provided to authorization reader 1 810 and portion 806 is provided to authorization reader 2 812. If only one authorization reader exists at a facility, then scratchlist 802 may not be divided into portions. Of course, in some embodiments scratchlist 802 can also be divided into more than two portions.

Whereas an authorization reader may receive a portion of scratchlist 802, a PoE reader (e.g., PoE reader 717) may receive the entire scratchlist 802, because the PoE reader may see tags with tickets stored by any of the authorization readers. If multiple PoE readers exist at a facility, each PoE reader may receive a copy of scratchlist 802.

In some embodiments, multiple authorization readers may select tickets from the same scratchlist portion as needed, and may update the scratchlist in real-time to prevent different authorization readers from selecting the same ticket. In this case, the scratchlist may not be divided into portions. In some embodiments, a central controller may distribute tickets (or groups of tickets) as needed, and may update the scratchlist as tickets are used.

In some embodiments, authorization readers may be provided with one or more ranges of ticket values to assign to tags instead of explicit ticket values. For example, an authorization reader may be provided a ticket value range in the form of a starting ticket value (e.g., ticket #1), an ending ticket value (e.g., ticket #101), and an increment value (e.g., increment by 1, 2, 3, or a dynamic value) within the range. The authorization reader may then select tickets to assign to tags based on the starting, increment, and ending values. For example, if an authorization reader is provided with a starting ticket value of 1, an ending ticket value of 10, and an increment value of 2, the reader may assign ticket values 1, 3, 5, 7, and 9. In some embodiments, authorization readers may be provided with multiple ranges, and different authorization readers may be provided with different ranges. PoE readers may know the range(s) assigned to the authorization readers, and may be able to use the ranges to verify a ticket written to a tag.

Diagram 850 is a detailed depiction of a scratchlist 852. Scratchlist 852 may be similar to scratchlist 802 in diagram 800, or may represent a scratchlist stored at an authorization reader, a PoE reader, or a central controller. Scratchlist 852 has multiple entries (rows), each entry corresponding to a particular ticket. For example, scratchlist 852 is depicted as having at least three tickets: ticket 1 862, ticket 2 864, and ticket 3 866. In other embodiments a scratchlist may have more or fewer tickets. Each ticket entry in scratchlist 852 may have a "ticket" field 810 and one or more optional other fields 870. Ticket field 860 stores a value for the corresponding ticket, which may be a randomly-generated number, may be based on a tag, item, or other identifier, or may be based on any other suitable data. Optional other field(s) 870 may store other information associated with the ticket. For example, the other field(s) 870 may store tag, item, authorization reader, or other identifiers associated with a particular ticket, timestamps, comments, or any other suitable information, and in some embodiments may be used to help determine if an item is authorized to leave a facility.

In some embodiments, when a PoE reader verifies that a read TP is both present in its locally-stored scratchlist and has not been previously read, the reader may store a timestamp, a location identifier, and/or identifiers associated with the PoE reader, the tag, or the attached item in the other field 870 associated with the read TP. Subsequently, if the PoE reader encounters a tag with a previously-read TP, it may retrieve a tag or item identifier from the tag and compare it to the tag/item identifier it has stored in the other field 870 associated with the TP. If the identifiers match, then the PoE reader may assume that the tag and associated item are re-entering or re-exiting the facility. On the other hand, if the retrieved identifier does not match the stored identifier, then the PoE reader may assume that the item is not authorized to leave the facility, and may sound an alarm or otherwise notify authorities.

Figure 9:
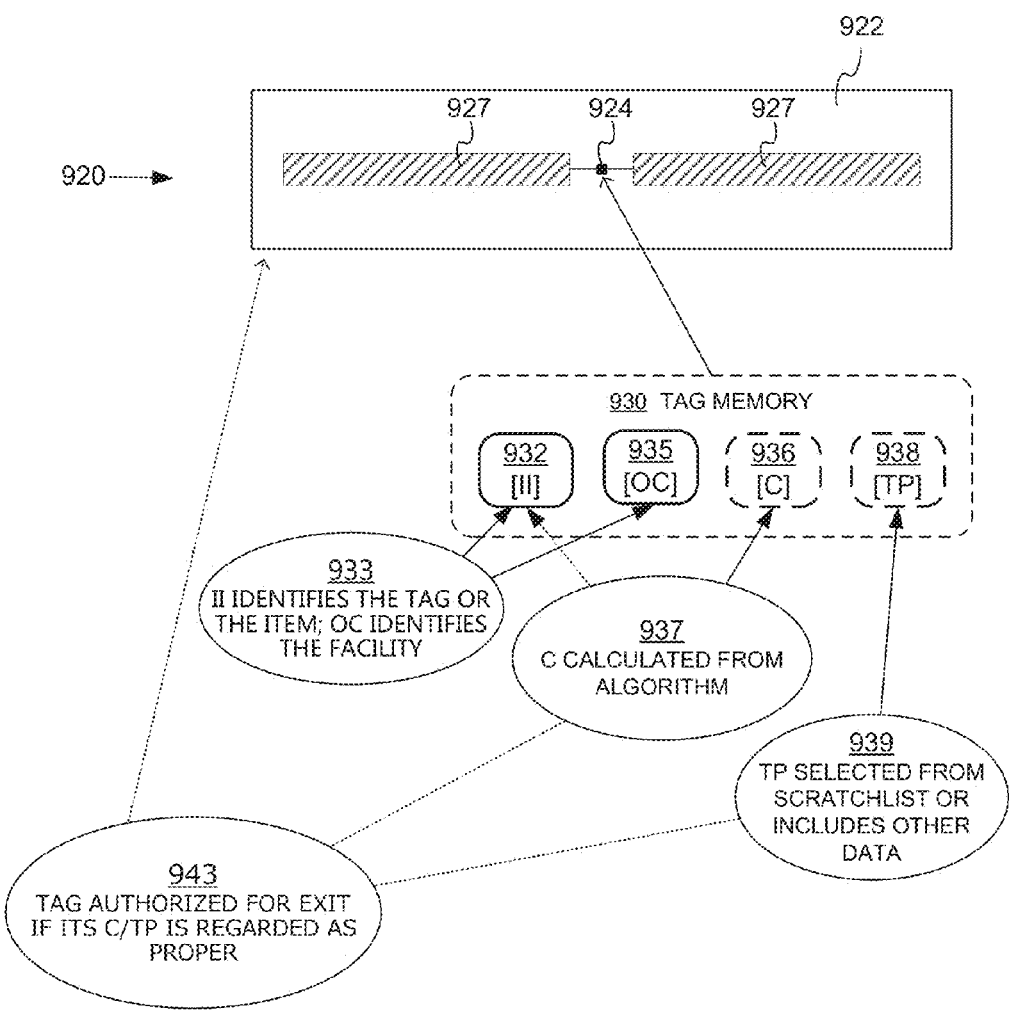
FIG. 9 illustrates major components of an RFID tag and how an item identifier, ownership code, digital signature and/or temporal parameter are stored in a tag according to embodiments.

FIG. 9 illustrates an RFID tag 920 storing an II, OC, optional C, and optional TP in tag memory. As discussed previously, RFID tag 920 includes IC 924 and antenna(s) 927 on inlay 922. IC 924 includes a tag memory 930 which may be flat or partitioned into sections. In a system according to embodiments, an II 932, OC 935, C 936, and TP 938 may be stored in the same or different sections of tag memory 930.

As indicated by comment 933, II 932 identifies the item to which the tag is attached. II 932 may be a tag identifier (TID), an electronic product code (EPC), a unique item identifier (UII), a serialized global trade item number (SGTIN), or similar. Also as indicated by comment 933, OC 935 identifies the facility, a parent of the facility, an organization associated with the facility, a manufacturer, a retail seller, etc. with which the item is associated. As indicated by comment 937, C 936 may be calculated based on an algorithm with one or more inputs. For example, C 936 may be calculated based on II 932, OC 935, TP 938, and/or a facility or authorization reader's secret or private key (if C includes a DS). TP 938 may include a ticket selected from a scratchlist (e.g., scratchlists 802 or 852 in FIG. 8) or may include other data (e.g., data in optional other field(s) 870 in FIG. 8), as indicated by comment 939.

As indicated by comment 943, RFID tag 920 (and, by association, the item attached to RFID tag 920) may be considered authorized for removal from the facility if C 936 and/or TP 938 is regarded as proper. For example, C 936 may be regarded as proper based on an algorithm and one or more inputs. TP 938 may be regarded as proper based on whether an included ticket is present in a scratchlist stored at or accessible by a PoE reader and whether it has been previously seen by a PoE reader. Of course, as described above, if OC 935 of RFID tag 920 does not match the facility's OC, or if OC 935 does not exist, then RFID tag 920 (and, by association, the item attached to RFID tag 920) may be considered to be not associated with the facility and therefore authorized for removal from the facility regardless of C or TP. To inhibit the unauthorized removal of items, II 932 and OC 935 may be write-locked or permanently write-locked and thereby rendered unchangeable. According to some embodiments, C 936 and/or TP 938 may be unlocked or permanently unlocked to facilitate erasure or overwriting for items returned to the facility. For example, a customer with a mobile device (e.g., mobile device 760) may purchase an item attached to tag 920, causing C 936 and/or TP 938 to be stored on tag 920. Subsequently, the customer may decide to return the item, and the mobile device may erase C 936 and/or TP 938 from tag 920.

Figure 10:
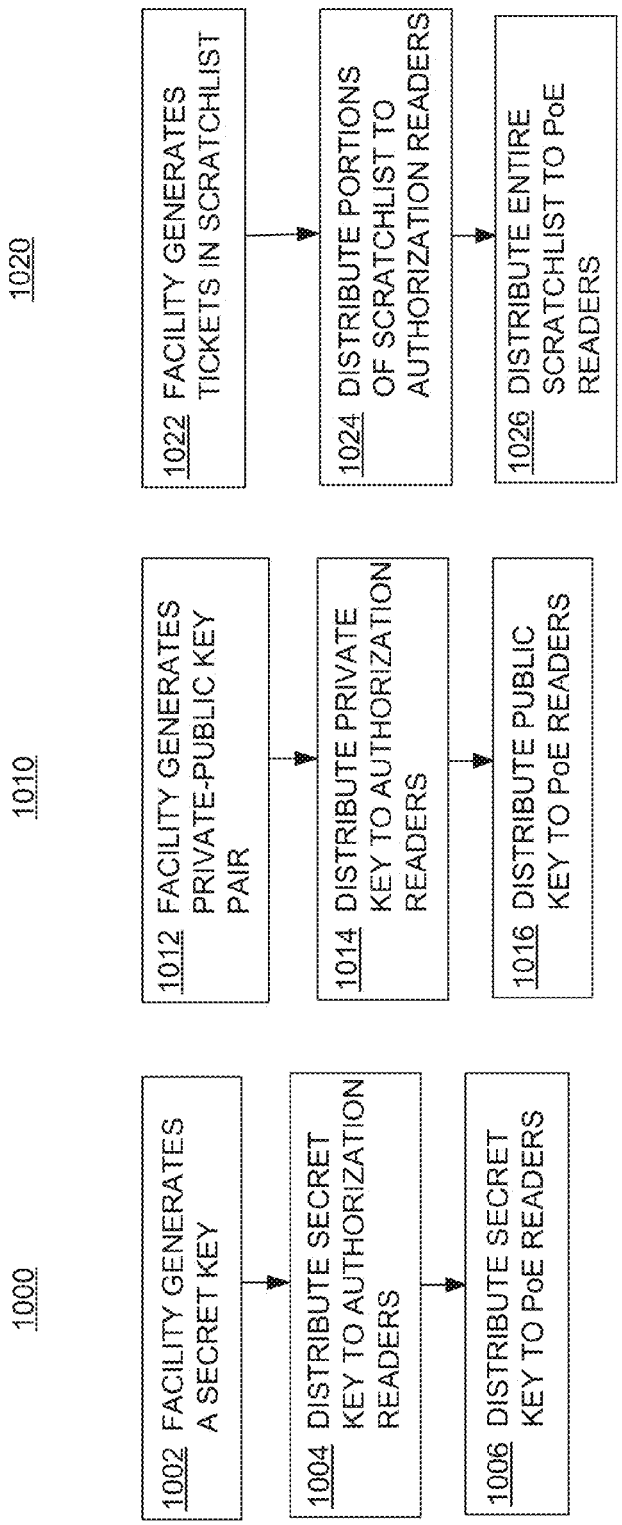
FIG. 10A is a flowchart for a process of generating and distributing secret keys.
FIG. 10B is a flowchart for a process of generating and distributing private-public key pairs.
FIG. 10C is a flowchart for a process of generating and distributing scratchlists and scratchlist portions.

FIG. 10A is a flowchart for a process of generating and distributing secret keys, such as may be used for symmetric cryptosystems. Process 1000 begins at operation 1002 with the facility generating a secret key. The secret key may be generated by the facility, a parent of the facility, an organization associated with the facility, a security agency or organization, by a computer system associated with the above, or by any other means as will be well known to those skilled in the art. At operation 1004 the secret key is provided to authorization readers within the facility. At operation 1006 the secret key is provided to PoE readers within the facility. The providing can be by a computer network such as network 480 of FIG. 4, or by any other means.

FIG. 10B is a flowchart for a process of generating and distributing public-private key pairs, such as may be used for asymmetric cryptosystems. Process 1010 begins at operation 1012 with the facility generating one or more public-private key pairs. The key pair(s) may be generated by the facility, a parent of the facility, an organization associated with the facility, a security agency or organization, by a computer system associated with the above, or by any other means as will be well known to those skilled in the art. At operation 1014 the private keys are distributed to authorization readers within the facility. In some embodiments, each authorization reader receives a private key from a different key pair. At operation 1016 the public keys corresponding to the private keys distributed to the authorization readers at operation 1014 are provided to PoE readers within the facility, allowing each PoE reader to verify digital signatures generated by any of the authorization readers. The providing can be by a computer network such as network 480 of FIG. 4, or by any other means.

FIG. 10C is a flowchart for a process of generating and distributing scratchlists and scratchlist portions. Process 1020 begins at operation 1022 with the facility generating a scratchlist containing multiple tickets. The facility may generate the tickets as a series of random numbers, for example based on a random number generator or pseudorandom number generator, a seed, or some other algorithm. At operation 1024 portions of the generated scratchlist are provided to authorization readers, as described above in FIG. 8. At operation 1026 the entire scratchlist is provided to one or more PoE readers, also as described above in FIG. 8. The providing can be by a computer network such as network 480 of FIG. 4, or by any other means. In some embodiments, the facility may periodically generate and distribute new scratchlists containing new tickets. For example, the facility may generate and distribute new tickets every hour, day, week, or at any suitable frequency. In some embodiments, the ticket generation frequency may be dynamic instead of fixed, and may be based on parameters such as ticket use rate, item exit rate, or any other suitable parameter. In such situations, tickets may remain unique for only a period of time, and authorization/PoE readers may be configured to use or allow duplicate tickets after the period of time.

Figure 11:
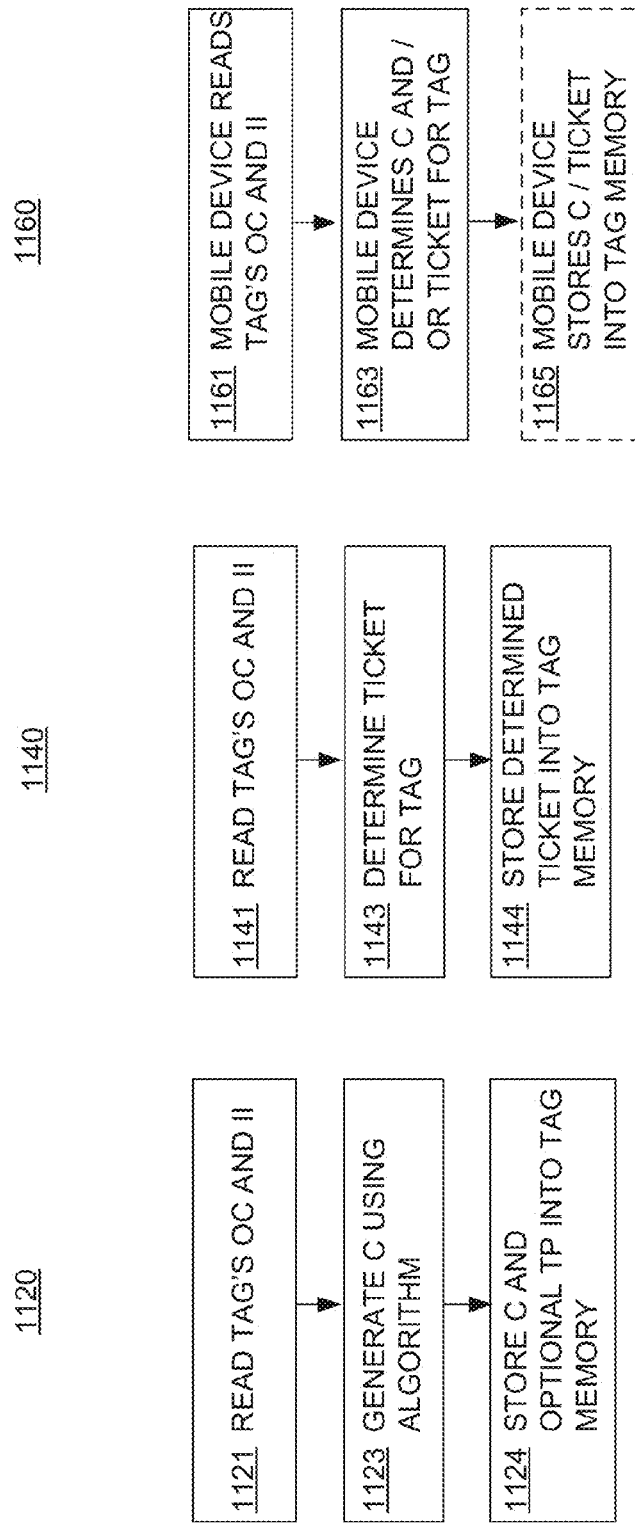
FIG. 11A is a flowchart for a process of storing a computed code in tag memory.
FIG. 11B is a flowchart for a process of storing a ticket in tag memory.
FIG. 11C is a flowchart for a process of having a mobile device store a computed code and/or ticket in tag memory.

FIG. 11A is a flowchart for a process of storing a code C and an optional TP in tag memory. Process 1120, which may be performed by an authorization reader, begins with operation 1121 where the authorization reader reads the tag's OC and/or II. If the OC does not match the facility's OC or does not exist then the tag may be considered foreign and exempted from the authorization process. At operation 1123 the authorization reader generates the code C. In some embodiments, the authorization reader generates C based on the II, the OC, and/or the TP. Of course, the terms "II" and "TP" are not to be taken literally—for convenience this document assumes the typical use case and denotes a number related to the item as an II, and a temporally variable number generated by the reader system or a ticket as a TP, but any similarly derived or generated numbers can be equally acceptable (such as a random number or a time-varying number). As described above, in some embodiments C is also based on a secret or private key associated with the facility and/or the authorization reader. Of course, C may be generated remotely rather than in the authorization reader, such as by remote components 470 of FIG. 4, and provided to the authorization reader. At operation 1124 the authorization reader stores C and optional TP into tag memory. In some embodiments, if different authorization readers use different algorithms or have different cryptographic keys, the authorization reader may also store an indicator of its identity on the tag, so that a subsequent PoE reader can determine the correct algorithm or key to use for verification of the C.

FIG. 11B is a flowchart for a process of storing a ticket in tag memory. In some embodiments, the ticket may be stored in tag memory as a TP, as described above in process 1120. Process 1140, which may be performed by an authorization reader, begins with operation 1141, similar to operation 1121 in process 1120. At operation 1143 the authorization reader determines a ticket to store into the tag (e.g., as a TP). For example, the authorization reader may consult a scratchlist portion stored at or otherwise accessible to the authorization reader and select a previously-unused ticket from the scratchlist portion. In some embodiments, the authorization reader may itself generate the ticket for the tag. For example, the authorization reader may generate the ticket based on a random number (e.g., generated by the reader or selected from a scratchlist portion), the identity of the authorization reader, a location, a timestamp, or any other suitable data. In some embodiments, the authorization reader generates the ticket based on a cryptographic algorithm. At operation 1144, the authorization reader stores the determined ticket into tag memory. In some embodiments, the authorization reader may further indicate to other authorization readers, PoE readers, or a network that the determined ticket has been used.

FIG. 11C is a flowchart for a process of having a mobile device store a computed code and/or ticket in tag memory. Process 1160 begins with operation 1161, which is similar to operation 1121 in process 1120 except that a mobile device (e.g., mobile device 760 in FIG. 7C) instead of an authorization reader reads the tag's OC and II. At operation 1163 the mobile device determines a code C and/or a ticket for the tag. For example, the mobile device may request the code C/ticket via a network from a processor or server associated with the facility. The processor/server may then generate the code C or select the ticket as described in operations 1123 and 1143 in processes 1120 and 1140, respectively. In some embodiments, the mobile device itself may generate at least part of the code C and/or select the ticket, for example based on some information or seed value provided by the processor/server. At optional operation 1165, the mobile device stores the determined code C and/or ticket into tag memory. In some embodiments, the mobile device may store the code C/ticket itself without storing the code C/ticket into tag memory.

Figure 12:
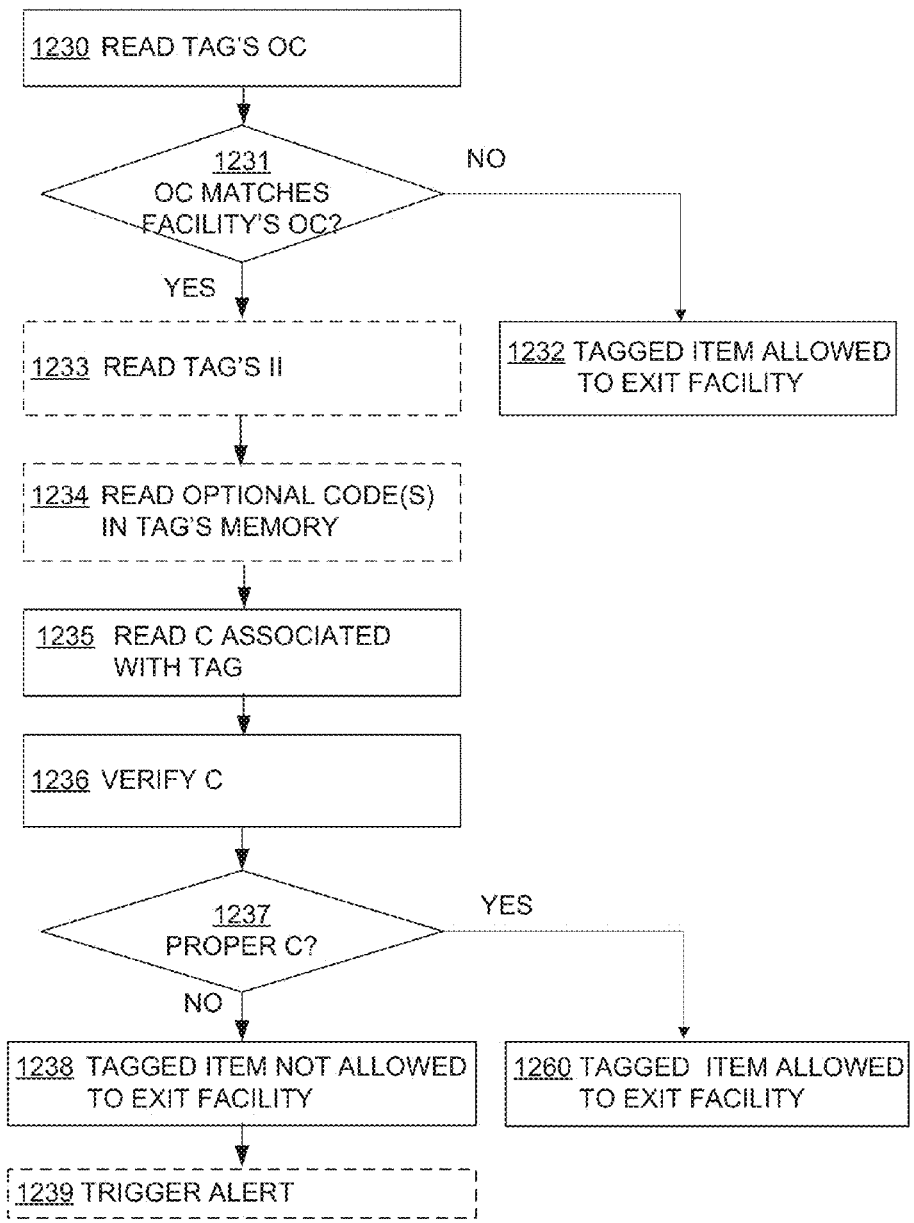
FIG. 12 is a flowchart illustrating a verification process for an RFID-based loss-prevention system.

FIG. 12 is a flowchart illustrating a verification process 1200 for an RFID-based loss-prevention system. Process 1200 may be implemented by a PoE reader.

Process 1200 begins with operation 1230, where the reader reads a tag's OC. At optional decision operation 1231, the reader determines whether the tag's OC matches the facility's OC. If the tag's OC does not match the facility's OC or does not exist then the tagged item is allowed to leave the facility at operation 1232. If the tag's OC matches the facility's OC then the PoE reader may read the tag's II at optional operation 1233, and may read optional code(s) such as tag feature information or the TP at optional operation 1234. At operation 1235 the reader reads a code C associated with the tag. For example, the code C may be stored on the tag or on a mobile device associated with the tag. At operation 1236 the reader verifies the code C. For example, the reader may compute a new verification value using a known algorithm and inputs and compare the new verification value with C. The reader may also (or instead) reverse the computation of C to derive its associated inputs and compare them to known, correct inputs. If C includes a DS, the reader may verify the DS using a process like that of FIG. 6B. In some embodiments, the reader may read a key or authorization reader identifier to determine the correct algorithm or key to use to verify C. In other embodiments, the reader may iterate through its known algorithms or keys to verify C. At decision operation 1237, if the PoE reader finds C to be proper then the tagged item is allowed to leave the facility at operation 1260. If the PoE reader finds C to be improper then the tagged item is not allowed to leave the facility at operation 1238. One method for preventing an item with an improper C from leaving a facility is by triggering an alert or alarm, such as at optional operation 1239. Although this document describes the reader operations as proceeding serially, those skilled in the art will recognize that in any deployed RFID system one or more of these operations may be merged (for example, the authorization reader may read the tag's II, OC, C, and TP all at once).

Figure 13:
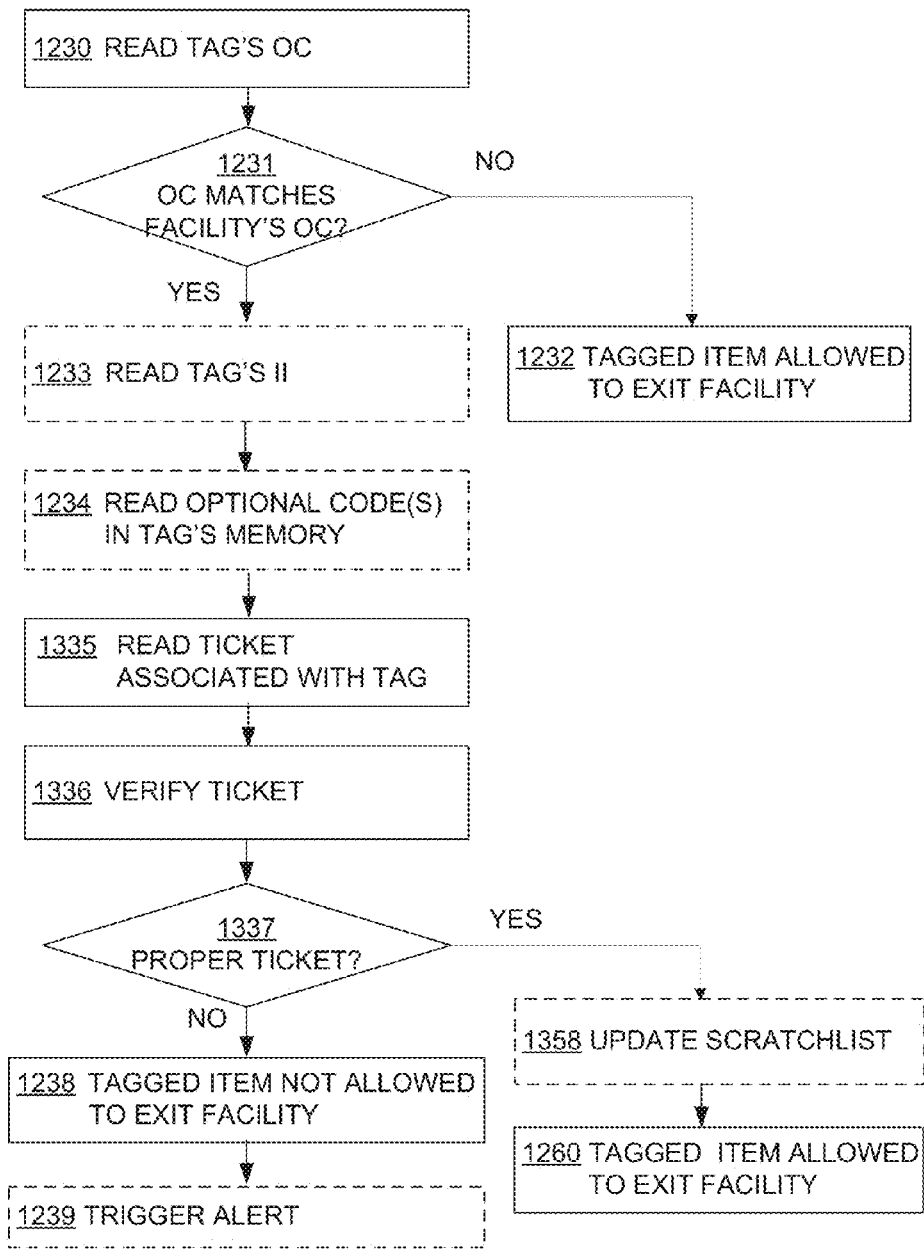
FIG. 13 is a flowchart illustrating a ticket-based verification process for an RFID-based loss-prevention system.

FIG. 13 is a flowchart illustrating a ticket-based verification process 1300 for an RFID-based loss-prevention system. Process 1300 is similar to process 1200, with similarly-numbered operations behaving similarly. However, in process 1300, the reader reads the tag's TP and an associated ticket at operation 1335 instead of a computed code C. At operation 1336, the reader attempts to verify the ticket. For example, the reader may determine if the ticket is present on a scratchlist (e.g., scratchlist 852) stored at the reader, if the reader has previously read the same ticket, and/or if the read ticket is associated with the correct item or tag (e.g., as described above in FIG. 8). If the reader determines that the tag is not associated with a proper ticket at operation 1337, at operation 1238 the tag and its attached item are not allowed to leave the facility, as described above in process 1200. On the other hand, if the reader determines that the tag is associated with a proper ticket at operation 1337, the reader may update its scratchlist at optional operation 1358, as described above in FIG. 8. For example, the reader may store a timestamp, a location identifier, and/or identifiers associated with the reader, the tag, the attached item, or an associated mobile device, and may associate the stored data with the corresponding ticket entry (e.g., as in scratchlist 852). In some embodiments, if multiple PoE readers exist, the reader may synchronize its updated scratchlist with other readers. Subsequently, the tagged item is allowed to leave the facility in operation 1260, as described above in process 1200.

Process 1200 and 1300 also apply in situations where a code C and/or a ticket is stored in a mobile device as described above in FIG. 7C and FIG. 11C. However, instead of reading the code C and/or the ticket from the tag, the reader reads the code C and/or the ticket from the mobile device. In some embodiments, a particular code C or ticket may be associated with and authorize multiple tags (and attached items) to be removed from the facility.

The operations described in processes 1000, 1010, 1020, 1120, 1140, 1160, 1200, and 1300 are for illustration purposes only. An RFID-based loss-prevention system and its operations may be implemented employing additional or fewer operations and in different orders using the principles described herein.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio Frequency Identification (RFID) based loss-prevention system comprising:
    a first RFID reader configured to write to an RFID tag, the tag associated with an item:
        an item identifier (II) if the II is lacking from the tag; and
        an ownership code (OC) if the OC is lacking from the tag;
    a second RFID reader configured to write a computed code to the RFID tag authorizing the item to be removed from a facility; and
    a third RFID reader configured to verify the computed code at an exit location of the facility in response to determining that the OC is associated with the facility.

2. The system of claim 1, further comprising a processor configured to compute the computed code based on at least one of the II, the OC, a temporal parameter (TP), and a reader identifier.

3. The system of claim 1, wherein the computed code is computed using an algorithm including at least one of an arithmetic operation, a logical operation, a bit-shift operation, a truncation operation, and an extension operation.

4. The system of claim 1, wherein the computed code is computed using an algorithm, the algorithm based on at least one of the II, the OC, a temporal parameter (TP), a cryptographic key, and a reader identifier.

5. The system of claim 1, wherein the third reader is further configured to verify the computed code by at least one of:
    computing a verification value and comparing the verification value to the computed code; and
    reading the computed code and reversing the computation of the computed code.

6. The system of claim 1, wherein the third reader is further configured to verify the computed code by using an algorithm selected based on at least one of the II, the OC, an identifier associated with the second reader, and a temporal parameter.

7. The system of claim 1, wherein at least two of the first, second, and third readers are integrated into a single reader.

8. The system of claim 1, wherein the second reader is configured to write the computed code upon verifying at least one of the II and the OC.

9. The system of claim 1, wherein at least one of the second reader and the third reader is configured to store the computed code.

10. A method for providing a Radio Frequency Identification (RFID) based loss-prevention system, the method comprising:
    associating an RFID tag with an item;
    writing an item identifier (II) to the tag if the II is lacking from the tag;
    writing an ownership code (OC) to the tag if the OC is lacking from the tag;
    writing a computed code to the tag upon authorizing removal of the item from a facility; and
    verifying the computed code at an exit location of the facility in response to determining that the OC is associated with the facility.

11. The method of claim 10, further comprising computing the computed code based on at least one of the II, the OC, a temporal parameter (TP), and a reader identifier.

12. The method of claim 10, further comprising computing the computed code using an algorithm including at least one of an arithmetic operation, a logical operation, a bit-shift operation, a truncation operation, and an extension operation.

13. The method of claim 10, further comprising computing the computed code using an algorithm, the algorithm based on at least one of the II, the OC, a temporal parameter (TP), a cryptographic key, and a reader identifier.

14. The method of claim 10, further comprising verifying the computed code by at least one of:
    computing a verification value and comparing the verification value to the computed code; and
    reading the computed code and reversing the computation of the computed code.

15. The method of claim 10, further comprising verifying the computed code by using an algorithm selected based on at least one of the II, the OC, an authorization reader identifier, and a temporal parameter.

16. The method of claim 10, further comprising activating an alarm in response to a failure to verify the computed code.

17. The method of claim 10, further comprising writing the computed code upon verifying at least one of the II and the OC.

18. The method of claim 10, further comprising storing the computed code in at least one reader.

19. A Radio Frequency Identification (RFID) based loss-prevention system comprising:
    a first RFID reader configured to write an item identifier (II) to an RFID tag associated with an item;
    a second RFID reader configured to write an ownership code (OC) to the tag;
    a third RFID reader configured to write a computed code to the RFID tag authorizing the item to be removed from a facility; and
    a fourth RFID reader configured to verify the computed code at an exit location of the facility in response to determining that the OC is associated with the facility.

20. The system of claim 19, wherein at least two of the first, second, third, and fourth readers are integrated into a single reader.

21. The system of claim 19, wherein the third RFID reader is a mobile device and is configured to receive the computed code by at least one of receiving the computed code from a network and computing at least part of the computed code.

* * * * *

UNITED STATES PATENT AND TRADEMARK OFFICE
CERTIFICATE OF CORRECTION

PATENT NO. : 8,872,636 B1  
APPLICATION NO. : 13/969308  
DATED : October 28, 2014  
INVENTOR(S) : Diorio et al.

Page 1 of 1

It is certified that error appears in the above-identified patent and that said Letters Patent is hereby corrected as shown below:

In the Specification

In Column 1, Line 1, Delete "Shorline," and insert -- Shoreline, --, therefor.

In Column 4, Line 5, Delete "signals)" and insert -- signals). --, therefor.

In Column 13, Line 1, Delete "that that" and insert -- that --, therefor.

In Column 15, Line 32, Delete "810" and insert -- 860 --, therefor.

In Column 19, Line 60, Delete "and or" and insert -- and/or --, therefor.

Signed and Sealed this  
Fifth Day of May, 2015

Michelle K. Lee  
*Director of the United States Patent and Trademark Office*